United States Patent Office 2,851,449
Patented Sept. 9, 1958

2,851,449
COPOLYMERS OF TRIFLUOROETHYL VINYL ETHER AND VINYL ESTERS

Calvin E. Schildknecht, Montclair, N. J., assignor to Air Reduction Company, Incorporated, New York, N. Y., a corporation of New York No Drawing. Application June 10, 1955
Serial No. 514,789

12 Claims. (Cl. 260—85.7)

This invention relates to polymeric materials and methods of preparing same. More particularly this invention is concerned with copolymers of 2,2,2-trifluroethyl vinyl ether and vinyl ethers.

Other copolymers of 2,2,2-trifluoroethyl vinyl ether are described in my copending related applications, Serial Number 514,790, filed June 10, 1955, and Serial Number 514,791, filed June 10, 1955.

Many homopolymeric materials, and in particular the homopolymers of vinyl esters of carboxylic acids, lack the pliability desirable in flexible films, especially at low temperatures. They require, for most uses as films the addition of other softening substances to make them more flexible or plastic. This "plasticization" has been accomplished either by the addition, after homopolymerization, of a variety of materials, referred to as external plasticizers, or by copolymerization with selected monomers, which are referred to as internal plasticizers. A number of difficulties have been encountered with external plasticization. For example, since the external plasticizer is present merely in physical admixture with the polymer, the external plasticizer is subject to migration, extraction or exudation from the film. The internal plasticizing monomers employed heretofore while improving the flexibility of the polymeric product have usually reduced the chemical or heat stability and/or the solvent resistance of the polymeric product. There is a need for new synthetic flexible film-forming materials which are resistant to organic solvents such as oils and lubricants, and which remain flexible over a wide temperature range.

The primary object of this invention is the preparation of new and useful copolymers. A further object is the provision of novel copolymers which are flexible over a wide temperature range, readily formed into films or molded shapes, chemically heat-stable, and possess outstanding solvent resistance. Another object is the preparation of valuable copolymers of 2,2,2- trifluoroethyl vinyl ether and vinyl ester of a carboxylic acid. A still further object of this invention is to provide a commercially feasible process for obtaining copolymers of 2,2,2-trifluoroethyl vinyl ether. Other objects will in part be obvious from, and will in part appear in, the following detailed description.

In accordance with the present invention, these objects are obtained by copolymerizing 2,2,2-trifluoroethyl vinyl ether with a copolymerizable vinyl ester of a carboxylic acid. The vinyl esters of carboxylic acids which are suitable in the practice of this invention include vinyl esters of saturated aliphatic acids, such as vinyl acetate, vinyl propionate, vinyl butyrate, vinyl caprylate, vinyl 2-ethylhexoate, vinyl pelargonate, vinyl laurate, vinyl palmitate, and vinyl stearate; vinyl esters of unsaturated aliphatic acids, such as vinyl crotonate; and vinyl esters of aromatic acids, such as vinyl benzoate. The above acids may be represented by the following formula

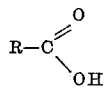

in which R is selected from the group consisting of aliphatic and aromatic hydrocarbon radicals. The vinyl esters enumerated above are merely illustrative. Other vinyl esters which may be suitable will readily occur to those skilled in the art to which this invention pertains.

The monomer, 2,2,2-trifluorethyl vinyl ether (herein sometimes referred to simply as trifluorethyl vinyl ether), can be represented by the following formula:

$$F_3C-CH_2-O-CH_2=CH_2$$

In general, 2,2,2-trifluoroethyl vinyl ether can be prepared by vinylation of 2,2,2-trifluoroethanol with acetylene in the presence of the corresponding alkali metal alcoholate, for example, potassium 2,2,2-trifluoroethanolate. A more detailed description may be found in the copending applications of Julius G. Shukys, Serial Number 290,582, filed May 28, 1952, and Serial Number 357,901, filed May 27, 1953. It has been found advantageous to use a purified trifluoroethyl vinyl ether in copolymerizations. By the term "purified" trifluoroethyl vinyl ether is meant trifluoroethyl vinyl ether substantially free from alcohol, acetylene, aldehyde, and other polymerization inhibiting materials. The trifluoroethyl vinyl ether may be purified by subjecting it to an acid wash with a mineral acid followed by fractional distillation, as more fully described in Shukys' application, Serial Number 357,901.

The homopolymerization of 2,2,2-trifluoroethyl vinyl ether has been described in applicant's copending application, Serial Number 409,057, filed on February 8, 1954, of which this application is a continuation-in-part. This compound homopolymerizes to form a high molecular weight, rubberlike, form-stable, non-tacky product only with great difficulty. As more fully described in the aforementioned application, such homopolymers are obtained by cationic polymerizations in the presence of certain activating chlorinated solvents at low temperatures. Entirely unexpectedly, it has now been found that copolymers of 2,2,2-trifluoroethyl vinyl ether and vinyl esters of carboxylic acids can be prepared smoothly and rapidly, under certain conditions, by free-radical means.

The copolymerizations of 2,2,2-trifluoroethyl vinyl ether with a vinyl ester of a carboxylic acid may be carried out in bulk, solution, suspension or emulsion in the presence of a free-radical supplying initiator. The free-radical supplying initiators used in the practice of this invention may be a peroxygen, persulphate or azo compound. The useful peroxygen compounds include the organic peroxides, such as dibenzoyl peroxide, benzoyl acetyl peroxide, dilauroyl peroxide, diacetyl peroxide, dipropionyl peroxide, benzoyl peroxide and lauroyl peroxide; dialkyl peroxides, such as diethyl peroxide and dipropyl peroxide; organic hydroperoxides, such as tert.-butyl hydroperoxide; inorganic peroxides, such as hydrogen peroxide and alkaline-earth metal peroxides. Suitable persulphate initiators include the sodium, potassium, calcium, barium and ammonium salts of persulphuric acid. Useful azo compound initiators include azo-bis-isobutronitrile and 1-azo-bis-1-phenylethylene. The free-radical supplying initiator should be employed in an amount of 0.001% to 5% by weight of the combined weight of the monomers and preferably there is employed between 0.01% and 1% by weight of the combined weight of the monomers. The exact quantity of initiator will depend upon the particular monomers and the initiator being employed.

Excess quantities of oxygen should be eliminated from the reaction sphere. This may be accomplished by purging the reaction vessel prior to copolymerization with an inert gas, such as nitrogen, carbon dioxide, the rare gases, such as argon, or mixtures thereof; and conducting the reaction in a substantially inert atmosphere, e. g. in an atmosphere of an inert gas or in a vacuum.

The copolymerizations when carried out in a non-solvent for the monomers, such as water, may be dispersed therein by using surface-active agents. Such surface-active agents may include anionic agents such as the alkali metal sulfates and sulfonates, including sodium lauryl sulfate, the sodium salt of the sulphonic acid of dioctyl succinic ester (Aerosol O. T.), alkyl aryl sulphonates, such as dodecyl benzene sulfonate (Santomerse), and the like. Hydrophilic colloids such as gum arabic, completely or partially hydrolyzed polyvinyl alcohol, gelatin, gum tragacanth, hydroxyethyl cellulose ("Cellosize"), carboxymethyl cellulose, etc., may be used in conjunction with or in place of the surface-active agent.

Activating agents may be used in combination with the free-radical supplying initiator. Such activators include water-soluble reducing agents, such as sodium bisulfite, sodium hydrosulfite, ferrous compounds, and sulfoxylates, such as sodium or zinc formaldehyde sulfoxylates. Other activators which can be used are the amine-type activators, such as triethanolamine, dimethyl aniline or triethylene tetramine. These activators normally are employed in concentrations equal to or lesser than the concentration of the free-radical supplying initiator employed.

The temperatures and pressures used for the copolymerization will depend, in part, upon the nature of the vinyl ester to be copolymerized with trifluoroethyl vinyl ether, and the molecular weight of the copolymer desired. The temperature may vary between 0°C. to 150° C., although temperatures of from 40–80° C. are preferred. Usually, elevated pressures are not necessary.

The time of copolymerization will depend upon a variety of factors including such factors as the vinyl ester used, the temperature of the copolymerization, and the amount and type of the free-radical supplying initiator and accelerator employed. Generally, the copolymerization time is between about 1–50 hours, and usually between about 2–20 hours.

The copolymers of this invention can contain variable amounts of each comonomer. For example, the copolymers can contain 5 to 95% by weight of trifluoroethyl vinyl ether and from 95 to 5% by weight of the vinyl ester of a carboxylic acid. However, those copolymers containing from 5 to 50% by weight trifluoroethyl vinyl ether units are preferred for technological as well as economic reasons. Technologically, favorable reaction rates and copolymers of high viscosity, good chemical stability, and free from discoloration can be obtained with less than equal molar proportions of trifluoroethyl vinyl ether. It has also been found that the molar proportion of trifluoroethyl vinyl ether entering the copolymer is lower than that in the mixture of monomers. This fact is favorable for the production of homogeneous products containing a minor proportion of trifluoroethyl vinyl ether units as internal plasticizer. Any unreacted trifluoroethyl vinyl ether can be readily recovered. Furthermore, advantageous rates of reaction are obtained when the molar proportion of trifluorcethyl vinyl ether in the copolymer is minor.

The copolymers of this invention unexpectedly possess high intrinsic viscosities or molecular weights. This is particularly surprising since the non-trifluoromethyl-containing alkyl vinyl ethers in copolymerization with most olefinic monomers depress greatly the degree of polymerization and intrinsic viscosity of copolymers formed. Furthermore, trifluoroethyl vinyl ether is surprisingly stable to hydrolysis even in aqueous acid conditions, whereas the non-trifluoromethyl-containing alkyl vinyl ethers hydrolyze too quickly to permit satisfactory copolymerization. The stability of trifluoroethyl vinyl ether to hydrolysis is particularly important since acid conditions often are desirable, for example, in aqueous emulsion, in order to give more stable copolymer latices. Further, copolymerization of trifluoroethyl vinyl ether can also be carried out with acidic or acid-producing comonomers. The stability of trifluoroethyl vinyl ether to hydrolysis permits recovery of any unreacted ether even when the reactions are carried out in an aqueous medium.

Trifluoroethyl vinyl ether has another additional advantage as a comonomer. Since trifluoroethyl vinyl ether does not homopolymerize by free-radical methods, the copolymers obtained therefrom are more homogeneous. Still greater homogeneity of the copolymers can be obtained by portionwise, increment, or continuous addition of the vinyl ether during the copolymerization reaction.

The copolymer rubbers prepared in accordance with this invention may be cured or vulcanized by conventional methods such as used with polymers of butadiene, and chloroprene. For example, treatment of the copolymer with sulfur, sulfur-containing compounds, or magnesium or zinc oxides may result in crosslinking of the copolymer. The properties of the copolymer may also be modified by incorporating a small proportion, e. g. less than 10%, of a bifunctional monomer into the reaction mixture, and conducting the copolymerization under conditions designed to give fusible partial copolymers containing residual reactive double bonds. Such bifunctional monomers include vinyl acrylate, allyl methacrylate, diallyl maleate, diallyl benzene phosphonate, triallyl cyanurate, trimethallyl phosphite and their fluorine derivatives. Conjugated dienes are not considered as belonging to this group. The various techniques for modifying the properties of copolymer and polymer products are well-known to the art.

The following examples will serve to illustrate more clearly the preparation of the novel copolymers of this invention. It is to be understood that these examples are not to be considered limitative of the scope of the invention. The parts given are parts by weight.

EXAMPLE I

*Coplymers of 2,2,2-trifluoroethyl vinyl ether and vinyl acetate*

10.4 g. of a mixture of 12.9 g. of vinyl acetate, 6.3 g. of 2,2,2-trifluoroethyl vinyl ether and 0.19 g. lauroyl peroxide were charged into a Pyrex glass tube. After sweeping the tube with nitrogen and evacuating the tube while cooled at −80° C. the tube was sealed. Copolymerization was allowed to proceed for one week at room temperature, about 25° C., and for 6 hours at 55° C. The copolymer was precipitated with 150 ml. of a 1:1 methanol-water mixture. The liquid was decanted and the copolymer was soaked with a fresh 1:1 mixture of methanol and water. After drying under vacuum at 50° C., 9.1 g. of a clear, colorless solid copolymer was obtained. Conversion to copolymer: 41 percent.

The copolymer was more flexible than polyvinyl acetate at room temperature. A film cast from the copolymer was flexible and highly adherent to glass. The monomer mixture contained 25 mol percent trifluoroethyl vinyl ether; the copolymer contained, upon analysis, 9.7 mol percent trifluoroethyl vinyl ether. The viscosity of the copolymer was determined as follows: An Ostwald-Fenske tube marked Fisher 100/#114, having a flow time of 37.0 sec. for methyl ethyl ketone was used. The determination was made at 25° C. The copolymer dissolved completely in methyl ethyl ketone, indicating that no crosslinking was evident.

TABLE I

| Copolymer | Conc. in g./100 ml. MEK [1] | Flow Time of Solution | $\eta$Csp |
|---|---|---|---|
| Vinyl Acetate-TFEVE [2] | 0.51 | 62.0 / 62.0 | 1.33 |

[1] MEK=methyl ethyl ketone.
[2] TFEVE=2,2,2-trifluoroethyl vinyl ether.

EXAMPLE II

*Copolymers of 2,2,2-trifluoroethyl vinyl ether and vinyl 2-ethylhexoate*

10.5 grams of a mixture comprising 12.75 g. of vinyl 2-ethylhexoate, 3.2 g. of 2,2,2-trifluoroethyl vinyl ether, and 0.16 g. of lauroyl peroxide were charged into a Pyrex glass tube. After purging the tube with nitrogen and evacuating the tube while it was cooled to −80° C., the tube was sealed. The reaction mixture was heated for 15 hours at a tempertaure of from 50°–55° C. A gel-like mass formed. The copolymer was separated from residual monomer by mixing said mass with 200 ml. of methanol. The copolymer was dried under vacuum at 50° C. Yield: 6.2 g. Conversion to copolymer: 59%. The dried copolymer was a colorless, clear, rubbery, balsam. The monomer mixture contained 25 mol percent trifluoroethyl vinyl ether; and the copolymer, on analysis, contained 16.5 mol percent trifluoroethyl vinyl ether units.

EXAMPLE III

*Copolymers of 2,2,2-trifluoroethyl vinyl ether and vinyl crotonate*

11 grams of a mixture containing 16.8 grams of vinyl crotonate, 6.3 g. of 2,2,2-trifluoroethyl vinyl ether, and 0.23 g. of lauroyl peroxide were charged into a Pyrex glass tube. The tube was purged with nitrogen, evacuated at −80° C., and then sealed. The mixture was heated for 6 hours at a temperature of from 50°–55° C. The tube was then opened. The copolymer was dried in vacuum at a temperature of 50° C. Yield: 1.9 g. Conversion 17 percent. The copolymer was a clear, colorles, rubbery solid. The monomer mixture contained 25 mol percent trifluoroethyl vinyl ether; and the copolymer contained, on analysis, 12.6 mol percent trifluoroethyl vinyl ether units.

The copolymer products of this invention are adapted to a variety of uses. They can be fabricated, as by molding or extrusion, into various shaped articles. From solution in organic solvents and from aqueous dispersion, flexible protective films may be deposited. Since the trifluoroethyl vinyl ether units in the copolymers are resistant to saponification or hydrolysis, vinyl alcohol-trifluoroethyl vinyl ether copolymers can be prepared from the vinyl ester-trifluoroethyl vinyl ether copolymer by the selective hydrolysis of the vinyl ester units. The partially saponified copolymers, e. g. vinyl alcohol-vinyl ester-trifluoroethyl tripolymers are particularly interesting as dispersing agents in aqueous media for preparation of adhesives and water-based paints. The copolymers of the higher vinyl esters, e. g. vinyl propionate and above may be used to provide water- and corrosion-resitant coatings. It may be desirable for certain applications to incorporate various plasticizers, fillers, stabilizers, pigments, or other resins into the copolymer compositions.

It is to be understood that many variations can be made without departing from the scope of this invention. The invention is not to be limited except as defined in the appended claims.

What is claimed is:

1. A binary copolymer containing from 5 to 50 percent by weight of said copolymer of 2,2,2-trifluoroethyl vinyl ether and from 95 to 50 percent by weight of said copolymer of a vinyl ester of a carboxylic acid formula

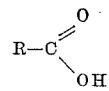

in which R is selected from the group consisting of aliphatic and aromatic hydrocarbon radicals.

2. A copolymer as defined in claim 1 wherein said vinyl ester is vinyl acetate.
3. A copolymer as defined in claim 1, wherein said vinyl ester is vinyl stearate.
4. A copolymer as defined in claim 1, wherein said vinyl ester is vinyl crotonate.
5. A copolymer as defined in claim 1, wherein said vinyl ester is vinyl 2-ethylhexoate.
6. A process for preparing binary copolymers of 2,2,2-trifluoroethyl vinyl ether and a vinyl ester of a carboxylic acid which comprises reacting, in a substantially inert atmosphere, a monomeric mixture consisting of the said monomers, wherein said ether is in an amount of from 5 to 95 percent by weight of the combined monomer weight in the presence of a free-radical supplying copolymerization initiator.
7. A process as defined in claim 6, wherein the copolymerization temperature is in the range of from about 0° C. to about 100° C.
8. A process as defined in claim 6, wherein said vinyl ester of a carboxylic acid is vinyl acetate.
9. A process as defined in claim 6, wherein said vinyl ester of a carboxylic acid is vinyl stearate.
10. A process as defined in claim 6, wherein said vinyl ester of a carboxylic acid is vinyl crotonate.
11. A process as defined in claim 6, wherein said vinyl ester of a carboxylic acid is vinyl 2-ethylhexoate.
12. A binary copolymer containing from 5 to 95 percent by weight of said copolymer of 2,2,2-trifluoroethyl vinyl ether and from 95 to 5 percent by weight of a vinyl ester of a carboxylic acid of the formula

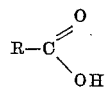

in which R is selected from the group consisting of aliphatic and aromatic hydrocarbon radicals

References Cited in the file of this patent

UNITED STATES PATENTS

| | | |
|---|---|---|
| 2,016,490 | Fikentscher | Oct. 8, 1935 |
| 2,631,975 | Lawson | Mar. 17, 1953 |
| 2,682,527 | Dickey et al. | June 29, 1954 |
| 2,732,370 | Codding | Jan. 24, 1956 |

OTHER REFERENCES

Chemical Abstracts, vol. 39, p. 5923 (1945).

UNITED STATES PATENT OFFICE
CERTIFICATE OF CORRECTION

Patent No. 2,851,449 September 9, 1958

Calvin E. Schildknecht

It is hereby certified that error appears in the printed specification of the above numbered patent requiring correction and that the said Letters Patent should read as corrected below.

Column 1, line 15, for "ethers" read -- esters --; line 28, for "coplymerization" read -- copolymerization --; line 49, after "and" insert -- a --; column 4, line 37, for "Coplymers", in italics, read -- Copolymers --, in italics; column 5, line 54, for "resitant" read -- resistant --; column 6, line 5, after "acid" insert -- of the --.

Signed and sealed this 27th day of January 1959.

(SEAL)
Attest:

KARL H. AXLINE
Attesting Officer

ROBERT C. WATSON
Commissioner of Patents